United States Patent
Kato et al.

(10) Patent No.: US 8,633,418 B2
(45) Date of Patent: Jan. 21, 2014

(54) SPARK PLUG MANUFACTURING METHOD

(75) Inventors: Tomoaki Kato, Nagoya (JP); Akikazu Taido, Nagoya (JP); Yuichi Nakano, Nagoya (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 759 days.

(21) Appl. No.: 12/593,038

(22) PCT Filed: Mar. 27, 2008

(86) PCT No.: PCT/JP2008/055832
§ 371 (c)(1),
(2), (4) Date: Sep. 25, 2009

(87) PCT Pub. No.: WO2008/123343
PCT Pub. Date: Oct. 16, 2008

(65) Prior Publication Data
US 2010/0101073 A1   Apr. 29, 2010

(30) Foreign Application Priority Data

Mar. 29, 2007 (JP) ................................ 2007-088338

(51) Int. Cl.
*B23K 26/00* (2006.01)
(52) U.S. Cl.
USPC ................................ 219/121.63; 219/121.8
(58) Field of Classification Search
None
See application file for complete search history.

(56) References Cited

U.S. PATENT DOCUMENTS

| | | | |
|---|---|---|---|
| 5,580,470 A | 12/1996 | Enokizono et al. | |
| 6,533,628 B1 | 3/2003 | Matsutani | |
| 6,853,116 B2 | 2/2005 | Hori et al. | |
| 6,885,135 B2 * | 4/2005 | Kanao et al. | 313/141 |
| 2002/0130602 A1 | 9/2002 | Kanao et al. | |
| 2006/0276097 A1 | 12/2006 | Suzuki et al. | |

FOREIGN PATENT DOCUMENTS

| | | |
|---|---|---|
| JP | 52-62146 | 5/1977 |
| JP | 60177983 A * | 9/1985 |
| JP | S60-177983 A | 9/1985 |

(Continued)

OTHER PUBLICATIONS

JP2002231417A Machine Translation.*
JP05277767A Machine Translation.*
JP3115733 Machine Translation.*
JP2002231417A JPO Machine Translation of Taniguchi et al. Aug. 2002.*

(Continued)

*Primary Examiner* — Tan N Tran
*Assistant Examiner* — Scott R Wilson
(74) *Attorney, Agent, or Firm* — Stites & Harbison PLLC; Jeffrey A. Haeberlin; Nicolo Davidson

(57) ABSTRACT

There is provided manufacturing method of a spark plug that includes a center electrode and a ground electrode with a discharge gap left therebetween. At least one of the center electrode and the ground electrode has an electrode body containing a base metal and a noble metal tip welded to the electrode body. The spark plug manufacturing method includes a laser welding step for welding the noble metal tip and the electrode body by placing the noble metal tip at a given position on the electrode body, irradiating a pulsed laser onto the noble metal tip and the electrode body and thereby sequentially forming welding spots corresponding to pulses of the laser in a circumferential direction of the noble metal tip, wherein at least one of the laser pulses is an initially increasing type laser pulse having a laser intensity waveform in which a laser intensity increases with time during a predetermined initial period from a pulse start time.

14 Claims, 12 Drawing Sheets

(56) References Cited

FOREIGN PATENT DOCUMENTS

| | | | |
|---|---|---|---|
| JP | 5-277767 | | 10/1993 |
| JP | 05277767 A | * | 10/1993 |
| JP | 6198468 A | * | 7/1994 |
| JP | H6-198468 A | | 7/1994 |
| JP | 6-312284 | | 11/1994 |
| JP | 2842967 B2 | | 1/1999 |
| JP | 3115733 B2 | * | 12/2000 |
| JP | 2001-015245 A | | 1/2001 |
| JP | 2001-068176 A | | 3/2001 |
| JP | 2001068176 A | * | 3/2001 |
| JP | 2001-135456 | | 5/2001 |
| JP | 2002-231417 | | 8/2002 |
| JP | 2002-231417 A | | 8/2002 |
| JP | 2002231417 A | * | 8/2002 |
| JP | 2003-071579 A | | 3/2003 |
| JP | 2006-269436 A | | 10/2006 |

OTHER PUBLICATIONS

JP 05277767A JPO Machine Translation of Yoshino et al. Oct. 1993.*
JP 3115733 B2 JPO Machine Translation of Nakajima Dec. 2000.*
JP 6-198468A JPO MAchine Translation of Koizumi et al. Jul. 1994.*
JP 2001068176A JPO MAchine Translation of Goto Mar. 2001.*
State Intellectual Property Office of the People's Republic of China, First Office Action for counterpart Chinese Application No. 200880010477.0, issued Jun. 9, 2011.
International Preliminary Report on Patentability and Written Opinion of the International Searching Authority for International Application No. PCT/JP2008/055832.
Office Action mailed Oct. 30, 2012 in corresponding Japanese Patent Application No. 2011-021420.
JPO, Office Action issued in corresponding Japanese Application No. 2011-208233, issued Mar. 18, 2013.

* cited by examiner

SPARK PLUG MANUFACTURING METHOD

CROSS-REFERENCE TO RELATED APPLICATIONS

This application is the National Stage of International Application No. PCT/JP2008/055832, filed on Mar. 27, 2008, which claims the priority to Japanese Patent Application Ser. No. 2007-088338, filed on Mar. 29, 2007, the entire contents of which is hereby incorporated by reference in its entirety.

TECHNICAL FIELD

The present invention relates to a method of manufacturing a spark plug for use in an internal combustion engine and, more particularly, to a method of manufacturing a spark plug with a center electrode and a ground electrode in which at least one of the center electrode and the ground electrode has an electrode body containing a base metal and a noble metal tip welded to the electrode body.

BACKGROUND ART

Patent Documents 1 to 3 discloses spark plugs, in each of which at least one of a center electrode and a ground electrode has an electrode body containing a base metal and a noble metal tip containing a noble metal and welded to the electrode body.

In Patent Document 1, the ground electrode is produced by resistance welding the noble metal tip to the electrode body to form a radially outwardly flanged portion at a bottom of the noble metal tip, and then, laser welding the noble metal tip to the electrode body with the irradiation of a laser onto the flanged portion of the noble metal tip.

In Patent Document 2, the ground electrode is produced in the following manner. The noble metal tip and the electrode body are irradiated with a pulsed laser to thereby weld the noble metal tip and the electrode body via a circumferential laser welding area in which welding spots corresponding to the respective pulses of the laser sequentially overlap each other in a circumferential direction of the noble metal tip. At this time, the laser irradiation energy per pulse is set lower for the formation of at least either the front part or end part of the welding area than for the formation of the other part of the welding area.

In Patent Document 3, the ground electrode is produced by irradiating a laser etc. at a given incident angle onto the border of the noble metal tip and the electrode body and thereby welding the noble metal tip and the electrode body to each other.

Patent Document 1: Japanese Laid-Open Patent Publication No. 2005-158323

Patent Document 2: Japanese Laid-Open Patent Publication No. 2002-231417

Patent Document 3: Japanese Laid-Open Patent Publication No. 2001-135456

In Patent Documents 1 to 3, the welding of the noble metal tip and the electrode body is performed by the irradiation of the pulsed laser in which each pulse has a rectangular waveform with a uniform laser intensity Sc throughout a pulse width Tc from a start time Tsc to a end time Tec. The laser welding with high irradiation energy per pulse is particularly effective at welding structural components of different melting points e.g. welding the noble metal tip containing the noble metal and the electrode body containing the base metal. However, molten metal spatters may occur under the laser irradiation and fly and adhere to the noble metal tip and the electrode body. This results in problems such as a deterioration in ignition performance of the spark plug and formation of a bridge in a discharge gap of the spark plug. Blowholes may also occur under the laser irradiation. In the case of forming the circumferential welding area in which the welding spots corresponding to the respective laser pulses overlap and continue into each other by the irradiation of the pulsed laser, it is particularly likely that the spatters and blowholes will occur during the formation of the latter welding sports. In addition, the metals molten by the laser irradiation get suddenly cooled and solidified so that cracks are likely to occur in the welding area during the solidification. This leads to a problem of separation of the noble metal tip from the electrode body due to a deterioration in joint strength of the welding area.

In this way, the conventional laser welding of the noble metal tip and the electrode body has the problems of the occurrence of the spatters, blowholes, cracks etc. As solutions to these problems, it is conceivable to adjust the welding state of the noble metal tip and the electrode body by changing the laser irradiation conditions such as the pulse width Tc and laser intensity Sc appropriately depending on the materials, shapes and dimensions of the noble metal tip and the electrode body. However, the above defect occurrence problems cannot be prevented sufficiently only by the changing of the laser irradiation conditions.

DISCLOSURE OF THE INVENTION

In view of the foregoing, the present invention has been made to provide a spark plug manufacturing method capable of preventing the occurrence of defects such as spatters, blowholes and cracks during a process of laser welding a noble metal tip and an electrode body.

As a result of intensive researches focusing on laser intensity waveforms, it has been found by the present inventors that the above-mentioned problems can be solved by modifying the rectangular laser intensity waveform in the laser welding process. The present invention is based on this finding.

According to a first aspect of the present invention, there is provided a manufacturing method of a spark plug, the spark plug having a center electrode and a ground electrode with a discharge gap left therebetween, at least one of the center electrode and the ground electrode having an electrode body containing a base metal and a noble metal tip welded to the electrode body, the manufacturing method comprising a laser welding step for welding the noble metal tip and the electrode body by placing the noble metal tip at a given position on the electrode body, irradiating a pulsed laser onto the noble metal tip and the electrode body and thereby sequentially forming welding spots corresponding to pulses of the laser in a circumferential direction of the noble metal tip, wherein at least one of the laser pulses is an initially increasing type laser pulse having a laser intensity waveform in which a laser intensity increases with time during a predetermined initial period from a pulse start time.

According to a second aspect of the present invention, there is provided a manufacturing method of a spark plug, the spark plug having a center electrode and a ground electrode with a discharge gap left therebetween, at least one of the center electrode and the ground electrode having an electrode body containing a base metal and a noble metal tip welded to the electrode body, the manufacturing method comprising a laser welding step for welding the noble metal tip and the electrode body by placing the noble metal tip at a given position on the electrode body, irradiating a pulsed laser onto the noble metal tip and the electrode body and thereby sequentially forming welding spots corresponding to pulses of the laser in a circumferential direction of the noble metal tip, wherein at least one of the laser pulses is a finally decreasing type laser pulse having a laser intensity waveform in which a laser intensity decreases with time during a predetermined final period up to a pulse end time.

In the spark plug manufacturing method of the present invention, the initially increasing type laser pulse is used in the laser welding of the noble metal tip and the electrode body. This makes it possible to heat the noble metal tip and the electrode body gradually and thereby possible to prevent spatters from occurring under the laser irradiation and flying and adhering to the noble metal tip and the electrode body and prevent blowholes from occurring in the respective welding spots. Further, the finally decreasing type laser pulse is used in the laser welding of the noble metal tip and the electrode body. This makes it possible to avoid sudden cooling of molten parts of the noble metal tip and the electrode body and solidify these molten parts gradually and thereby possible to prevent cracks from occurring in the respective welding spots.

BEST MODE FOR CARRYING OUT THE INVENTION

Figure 1:
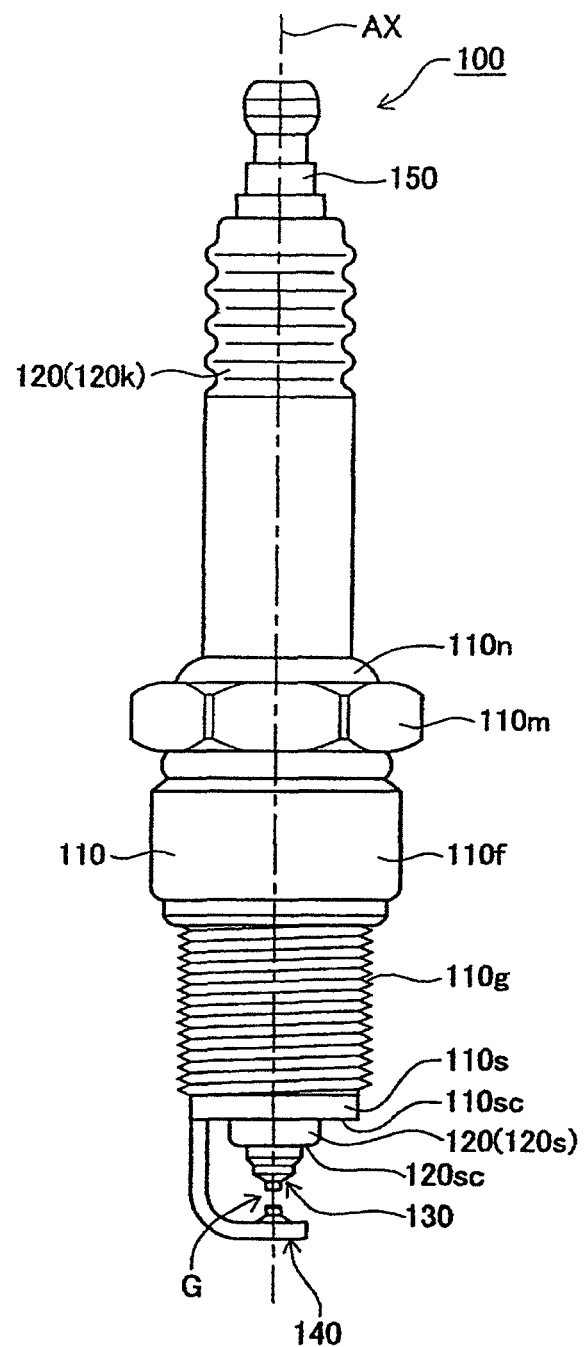
FIG. 1 is a side view of a spark plug according to a first embodiment of the present invention.

The present invention will be described in detail below with reference to the drawings. Herein, like parts and portions are designated by like reference numerals to omit repeated explanations thereof.

[First Embodiment]

A spark plug 100 according to a first embodiment of the present invention is designed for use in an internal combustion engine by mounting on a cylinder head of the engine. As shown in FIG. 1, the spark plug 100 includes a metal shell 110, an insulator 120, a center electrode 130 and a ground electrode 140.

The metal shell 1 is made of low carbon steel and formed into a cylindrical shape in the direction of an axis AX. The metal shell 11 includes a flanged portion 110f having a relatively large diameter, a tool engagement portion 110m formed on a rear side (upper side in the drawing) of the flanged portion 110 with a hexagonal cross section so as to engage with a tool for mounting the spark plug 100 on the cylinder head and a swaged portion 110n formed on a rear side of the tool engagement portion 110m so as to fix the insulator 120 to the metal shell 110 by swaging. The metal shell 111 further includes a front end portion 110s located on a front side (lower side in the drawing) of the flanged portion 110f and having a smaller diameter than that of the flanged portion 110 and an outer circumferential surface formed with a mounting thread 110g to screw the spark plug 100 into the cylinder head.

The insulator 2 is made of alumina ceramic and surrounded by the metal shell 110 with a front end portion 120s thereof protruding toward the front (lower side in the drawing) from a front end face 110sc of the metal shell 110 and a rear end portion 120k thereof protruding toward the rear (upper side in the drawing) from the swaged portion 110n of the metal shell 110. An axial hole is formed through the insulator 2 in the direction of the axis AX so as to insert and fix the center electrode 130 in a front side (lower side in the drawing) of the insulator axial hole and to insert and fix a terminal fitting 150 in a rear side (upper side in the drawing) of the insulator axial hole for application of a high voltage to the center electrode 130.

Figure 2:
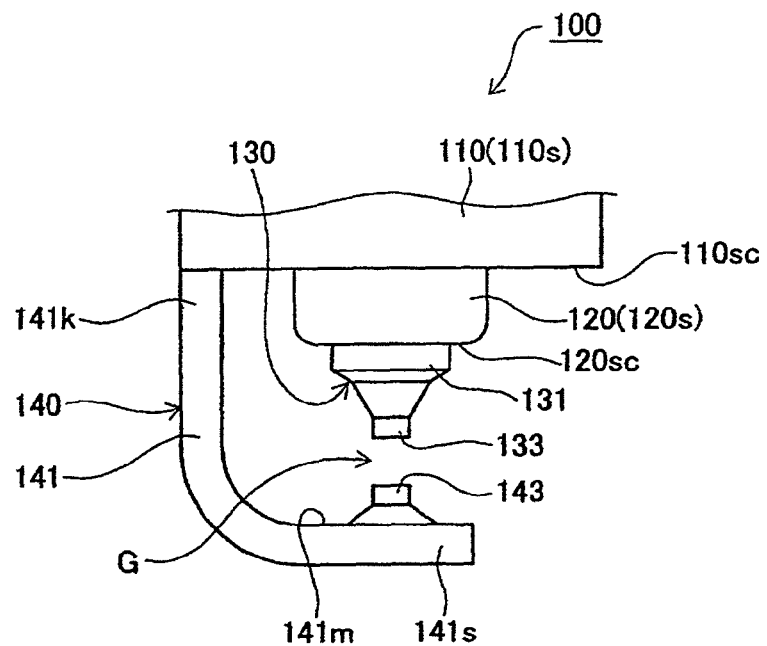
FIG. 2 is an enlarged view of a center electrode and a ground electrode of the spark plug according to the first embodiment of the present invention.
Figure 3:
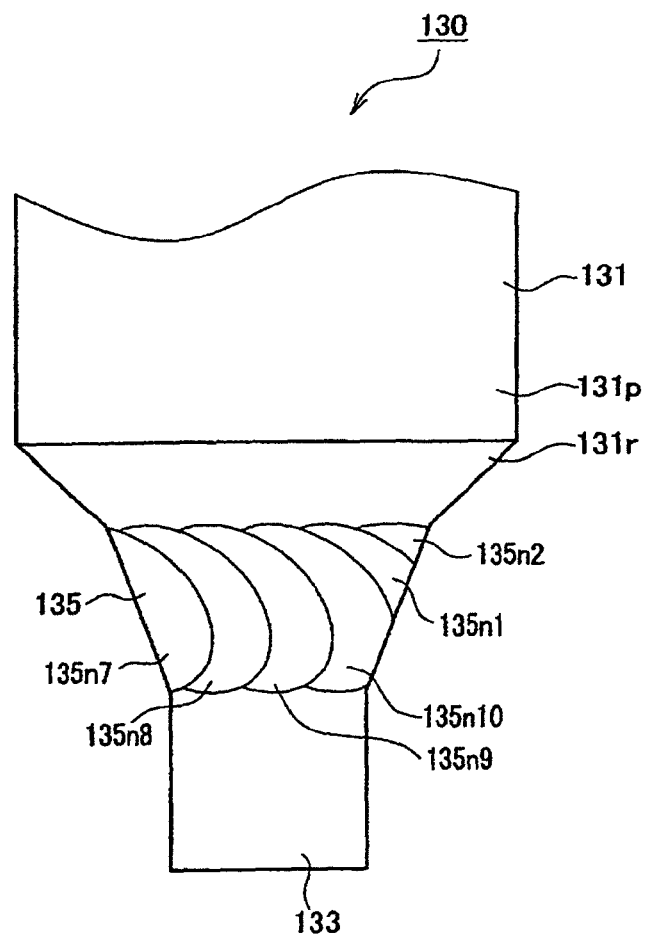
FIG. 3 is an enlarged view of a front end portion of the center electrode of the spark plug according to the first embodiment of the present invention.
Figure 4:
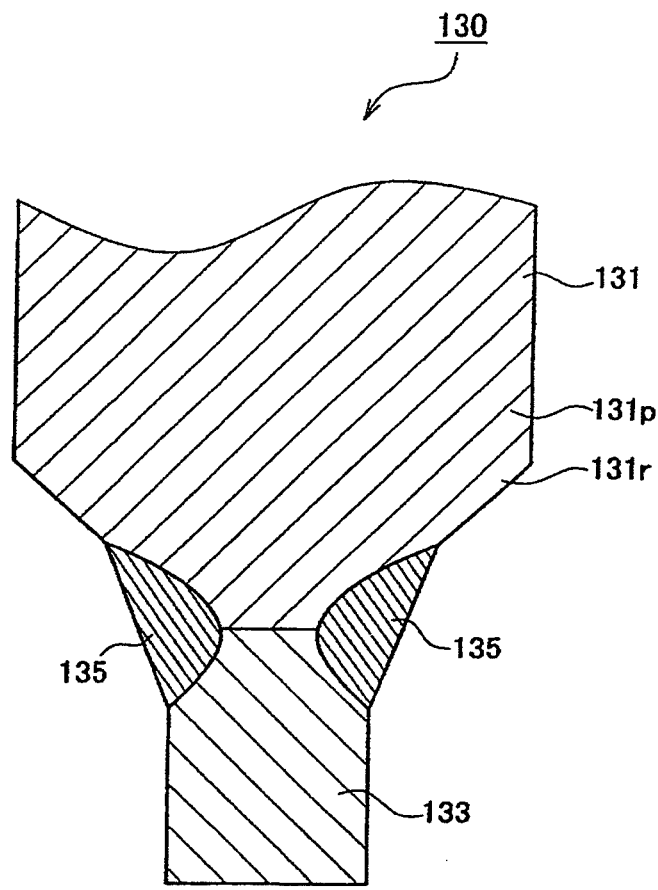
FIG. 4 is an enlarged section view of the front end portion of the center electrode of the spark plug according to the first embodiment of the present invention.
Figure 7:
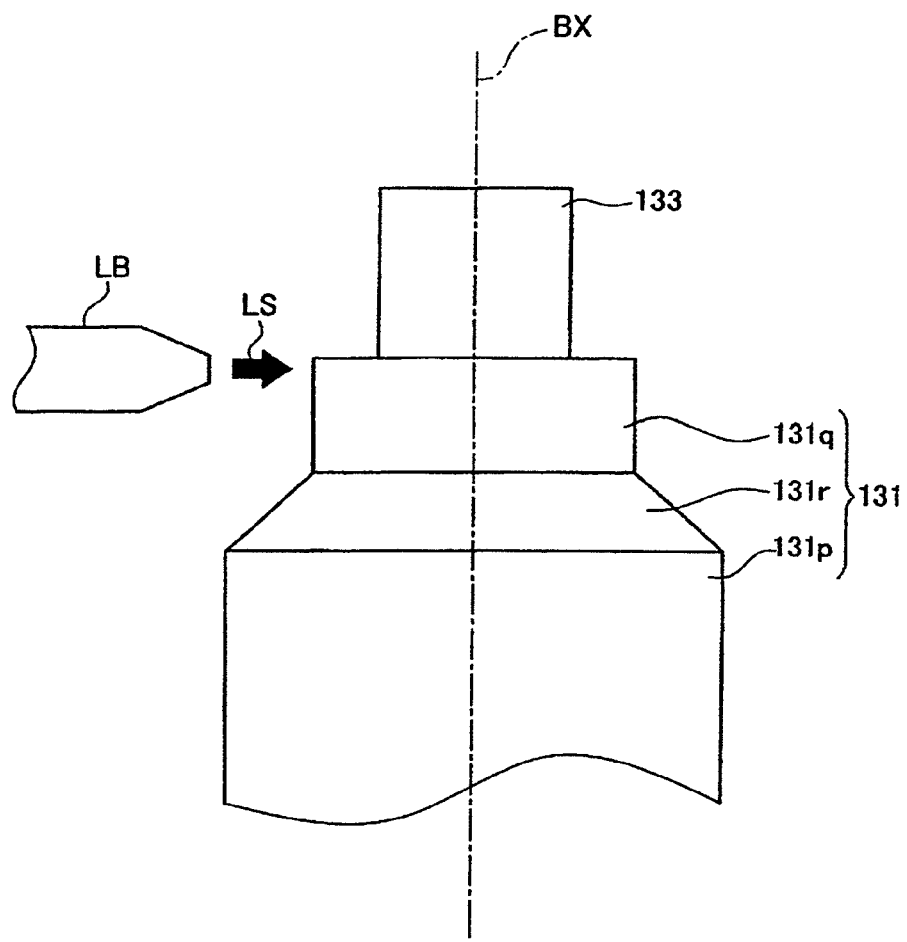
FIG. 7 is a schematic view of a state of irradiating a pulsed laser during a laser welding step for formation of the center electrode in a manufacturing method of the spark plug according to the first embodiment of the present invention.

The center electrode 130 is retained in the insulator 120 with a portion thereof protruding toward the front (lower side in the drawing) from a front end face 120sc of the insulator 120. As shown in FIGS. 2 to 4, the center electrode 130 has a center electrode body 131 located on a rear side (upper side in the drawing) thereof and a first noble metal tip 133 located on a front side (lower side in the drawing) thereof. The center electrode body 131 includes a first cylindrical section 131p located on a rear side thereof and having a cylindrical column shape with a relatively large diameter, a second cylindrical section 131q located on a front side thereof and having a cylindrical column shape with a smaller diameter than that of the first cylindrical section 131p and a conical section 131r located between the first and second cylindrical sections 131p and 131q and having a truncated cone shape as shown in FIG. 7. The center electrode body 131 is made of Ni alloy containing Ni as a main component. The first noble metal tip 133 has a cylindrical column shape with a diameter of 0.6 mm and is joined by laser welding to a front end of the center electrode body 131 so as to protrude toward the front (lower side in the drawing). The first noble metal tip is made of noble metal alloy such as It-Pt alloy.

The first noble metal tip 133 and the center electrode body 131 are laser welded by laser pulse irradiation, so as to form therebetween a welding area in which the first noble metal tip 133 and the center electrode body 131 are molten and solidified together and, more specifically, a circumferential welding area 135 in which ten welding spots 135n1 to 135n10 sequentially overlap and continue in a circumferential direction of the first noble metal tip 133. (See FIG. 3.) In terms of the joining strength, it is preferable that the adjacent welding spots 135n of the circumferential welding area overlaps each other although the multiple welding sports 135n can be spaced apart from each other in the circumferential direction of the noble metal tip 133.

Figure 5:
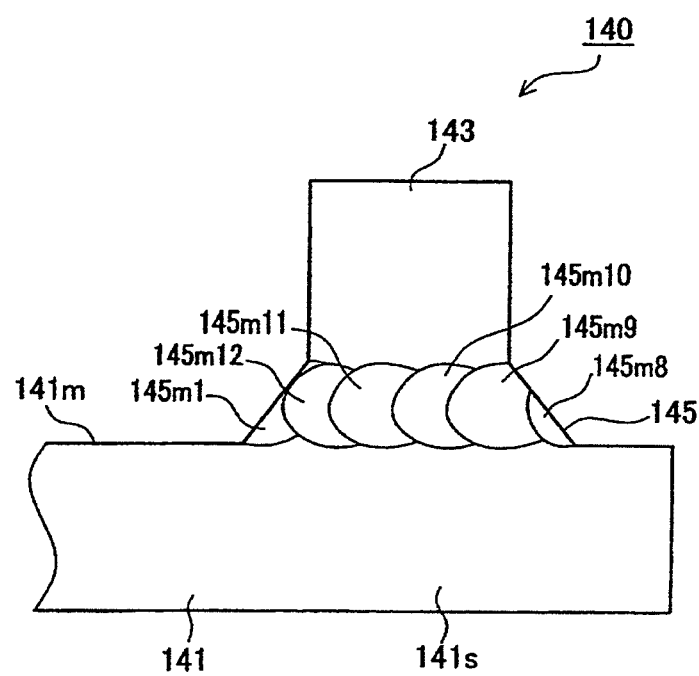
FIG. 5 is an enlarged view of a front end portion of the ground electrode of the spark plug according to the first embodiment of the present invention.
Figure 6:
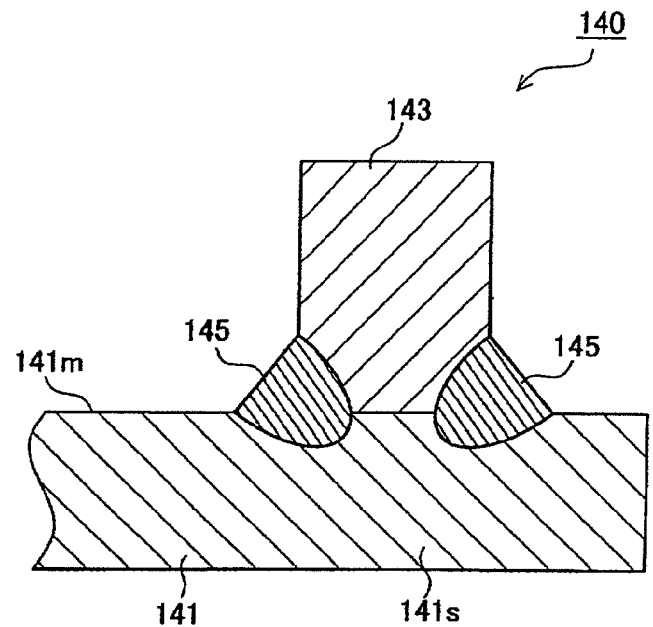
FIG. 6 is an enlarged section view of the front end portion of the ground electrode of the spark plug according to the first embodiment of the present invention.

As shown in FIGS. 2, 5 and 6, the ground electrode 140 has a ground electrode body 141 located on a front side (lower side in the drawing) thereof and a second noble metal tip 143 located on a rear side (upper side in the drawing) thereof. The ground electrode body 141 is made of Ni alloy containing Ni as a main component. Further, the ground electrode body 141 is joined at a rear end 141k thereof to the front end face 110sc of the metal shell 110 and is bent so as to direct a front end 141s thereof toward the axis AX with its radially inner side 141m facing the first noble metal tip 133 of the center electrode 130. The second noble metal tip 143 has a cylindrical column shape with a diameter of 0.7 mm and is joined by laser welding to the inner side 141m of the front end 141s of the ground electrode body 141 so as to protrude toward the rear (upper side in the drawing) and face the first noble metal tip 133. There is a discharged gap G between the second noble metal tip 143 and the first noble metal tip 133 for generation of a spark discharge. The second noble metal tip 143 is made of noble metal alloy such as Pt—Rh alloy.

The second noble metal tip 143 and the ground electrode body 141 are laser welded by laser pulse irradiation, so as to form therebetween a welding area in which the second noble metal tip 143 and the ground electrode body 141 are molten and solidified together and, more specifically, a circumferential welding area 145 in which twelve welding spots 145m1 to 145m12 sequentially overlap and continue in a circumferential direction of the second noble metal tip 143. (See FIG. 5.) In terms of the joining strength, it is preferable that the adjacent welding spots 145m of the circumferential welding area overlaps each other although the multiple welding sports 145m can be spaced apart from each other in the circumferential direction of the noble metal tip 133.

A manufacturing method of the spark plug 100 will be next explained below.

First, the center electrode body 131 with the first cylindrical section 131p, the second cylindrical section 131q and the conical section 131r and the first noble metal tip 133 of cylindrical column shape are prepared. The first noble metal tip 133 is then laser welded to the center electrode body 131 by placing the first noble metal tip 133 on the center of the second cylindrical section 131q of the center electrode body 131 and irradiating the border of the first noble metal tip 133 and the center electrode body 131 with a pulsed laser LS by a laser irradiation device LB. This step corresponds to a laser welding step in the present invention.

More specifically, the pulsed laser LS is irradiated to form the circumferential welding area 135 in which ten welding sports 135n1 to 135n10 corresponding to pulses N1 to N10 of the irradiated laser LS sequentially overlap and continue in the circumferential direction of an axis BX of the first noble metal tip 133 such that the first noble metal tip 133 and the center electrode body 131 are welded via the circumferential welding area 135. At this time, the laser welding conditions are controlled to a pulse width Ta of the laser pulses N1 to N10 of 2 msec, a frequency of the laser pulses N1 to N10 of 10 Hz and a shot number of 10 pulses.

At least one of the laser pulses N1 to N10 is set to be of the initially increasing type in which the laser pulse has a waveform that the laser intensity increases with time during an initial period Ta1 from a pulse start time tsa, and/or of the finally decreasing type in which the laser pulse has a waveform that the laser intensity decreases with time during a final period Ta3 up to a pulse end time tea. Preferably, each of the initial period Ta1 and the final period Ta3 is controlled to 10% to 40% of the pulse width Ta.

Figure 8:
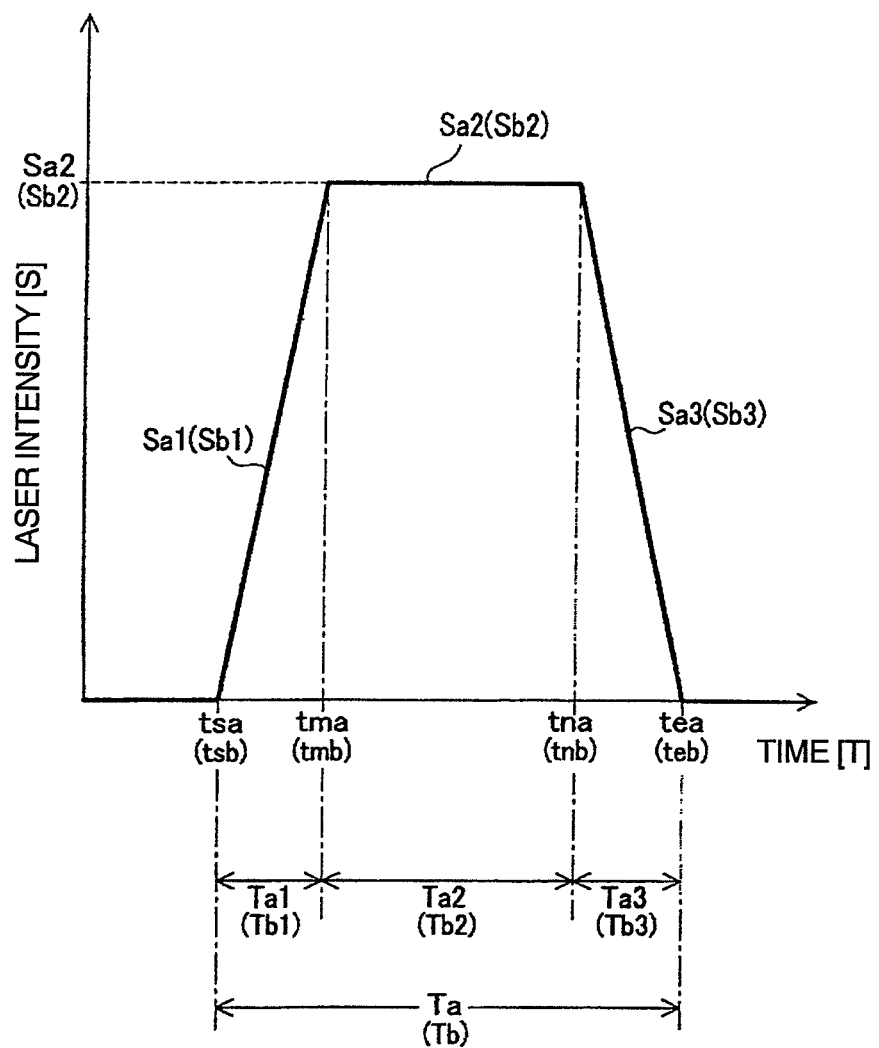
FIG. 8 is a schematic view of a laser intensity waveform of the pulsed laser irradiated at the laser welding step in the manufacturing method of the spark plug according to the first embodiment of the present invention.

In the first embodiment, the waveforms of the laser pulses N1 to N10 are set as follows as shown in FIG. 8. It is herein defined that the period of 20% of the pulse width Ta (2 msec) from the pulse start time tsa is the initial period Ta1 (0.4 msec); the period of 20% of the pulse width Ta (2 msec) up to the pulse end time tea is the final period Ta3 (0.4 msec); and the period between the initial and final periods Ta1 and Ta3 is the middle period Ta2 (1.2 msec). In each of the waveforms of the laser pulses N1 to N10, the laser intensity Sa1 increases with time during the initial period Ta1; and the laser intensity Sa3 decreases with time during the final period Ta3. Namely, all of the laser pulses N1 to N10 are set to be of the initially increasing type and of the finally decreasing type in the first embodiment.

More specifically, the laser intensity Sa1 is controlled so as to gradually and linearly increase with time, starting from zero, during the initial period Ta1 from the start time tsa to time tma. During the subsequent middle period Ta2 from the time tma to time tna, the laser intensity Sa2 is kept constant. The laser intensity Sa3 is controlled so as to gradually and linearly decrease with time during the final period Ta3 from the time tna to the end time tea and reach zero at the end time tea.

By increasing the laser intensity Sa1 with time during the initial period Ta1 as explained above, it is possible to effectively prevent spatters from occurring and flying and adhering to the first noble metal tip 133 and the center electrode body 131 due to sudden temperature increases at and around the surfaces of the first noble metal tip 133 and the center electrode body 131 at the initiation of the laser irradiation. It is also possible to effectively prevent blowholes occurring in the respective welding spots 135n1 to 135n10. It is further possible, by decreasing the laser intensity Sa3 with time during the final period Ta3 as explained above, to effectively prevent cracks from occurring due to stress on the interfaces of the welding spots 135n1 to 135n10 with the first noble metal tip 133 and the center electrode body 131 under sudden cooling of the welding spots 135n1 to 135n10.

It suffices that at least one of the laser pulses N1 to N10 is of the initially increasing type in the present invention. In other words, all or part of the laser pulses N1 to N10 can be set to the initially increasing type. In order to prevent the occurrence of the spatters and blowholes under the laser irradiation, it is preferable that all of the laser pulses N1 to N10 are of the initially increasing type as explained above.

It also suffices that at least one of the laser pulses N1 to N10 is of the finally decreasing type in the present embodiment. In other words, all or part of the laser pulses N1 to N10 can be set to the finally decreasing type. In order to prevent the occurrence of the cracks under the laser irradiation, it is preferable that all of the laser pulses N1 to N10 are of the finally decreasing type as explained above.

Figure 9:
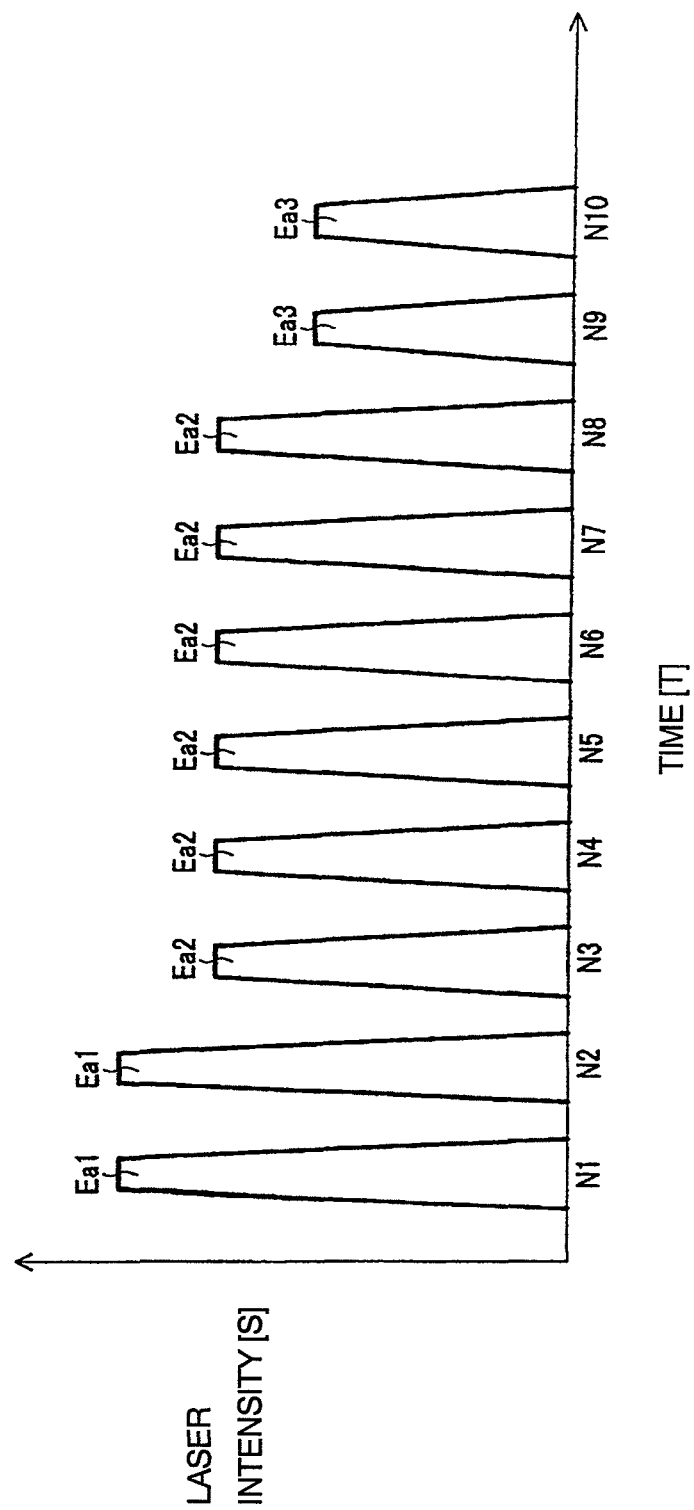
FIG. 9 is a schematic view of laser pulses of the pulsed laser irradiated at the laser welding step for formation of the center electrode in the manufacturing method of the spark plug according to the first embodiment of the present invention.

Among the ten laser pulse shots N1 to N10, first two laser pulses N1 and N2 are classified as initial laser pulses; last two laser pulses N9 and N10 are classified as final laser pulses; and six laser pulses N3 to N8 between the initial laser pulses N1 and N2 and the final laser pulses N9 and N10 are classified middle laser pulses as shown in FIG. 9 in the first embodiment. The laser irradiation energy per pulse is stepwisely decreased in such a manner that: the initial laser pulse N1, N2 has the highest laser irradiation energy per pulse; and the final laser pulse N9, N10 has the lowest laser irradiation energy per pulse. It is herein preferable that: the laser irradiation energy Ea1 per pulse of the initial laser pulses N1 and N2 is 5% to 30% higher than the laser irradiation energy Ea2 per pulse of the middle laser pulses N3 to N8; and the laser irradiation energy Ea3 per pulse of the final laser pulses N9 and N10 is 5% to 30% lower than the laser irradiation energy Ea2 per pulse of the middle laser pulses N3 to N8.

In the first embodiment, the laser irradiation energy Ea2 per pulse of the six middle laser pulses N3 to N8 is controlled to a reference energy level of 1.7 J. The laser irradiation energy Ea1 per pulse of the two initial laser pulses N1 and N2 is controlled to 1.87 J so as to be 10% higher than the laser irradiation energy Ea2 per pulse of the middle laser pulses N3 to N8. On the other hand, the laser irradiation energy Ea3 per pulse of the final laser pulses N9 and N10 is controlled to 1.53 J so as to be 10% lower than the laser irradiation energy Ea2 per pulse of the middle laser pulses N3 to N8.

In the case of sequentially forming the welding spots corresponding to the respective pulses of the pulsed laser in the circumferential direction of the noble metal tip, the spatters and blowholes are likely to occur during the formation of the latter welding spots. It is because the latter welding spots readily rise in temperature as the laser irradiation for the formation of the latter welding spots generates heat at the time some of heat induced by the laser irradiation for the formation of the preceding welding spots remains without being removed sufficiently.

By contrast, the molten states of the welding spots 135n1 to 135n10 can be made uniform by controlling the laser irradiation energy stepwisely to Ea1, Ea2 and Ea3 and thereby limiting the effect of the residual heat caused by the preceding laser pulses in the first embodiment. It is thus possible to effectively prevent the occurrence of the spatters and blowholes under the laser irradiation, notably under the irradiation of the latter laser pulses. It is possible to more effectively prevent the occurrence of the spatters and blowholes under the laser irradiation by setting the laser irradiation energy Ea1 higher by a given amount than the laser irradiation energy Ea2 (i.e. setting the laser irradiation energy Ea2 lower by the given amount than the laser irradiation energy Ea1) and setting the laser irradiation energy Ea3 lower by a given amount than the laser irradiation energy Ea2.

Next, the center electrode 130 is fitted in the separately prepared insulator 120 by any known technique. The terminal fitting 150 is also fitted in the insulator 120. The glass sealing is then performed. Further, the metal shell 1 is prepared. The rod-shaped ground electrode body 141 (i.e. the ground electrode body 141 in a state of not being joined with the second noble metal tip 143 and not being subjected to bending) is bonded to the metal shell 1 by any known technique. The metal shell 1 with the ground electrode body 141 and the insulator 120 with the center electrode 130 etc. are put together and subjected to swaging and the like.

Figure 10:
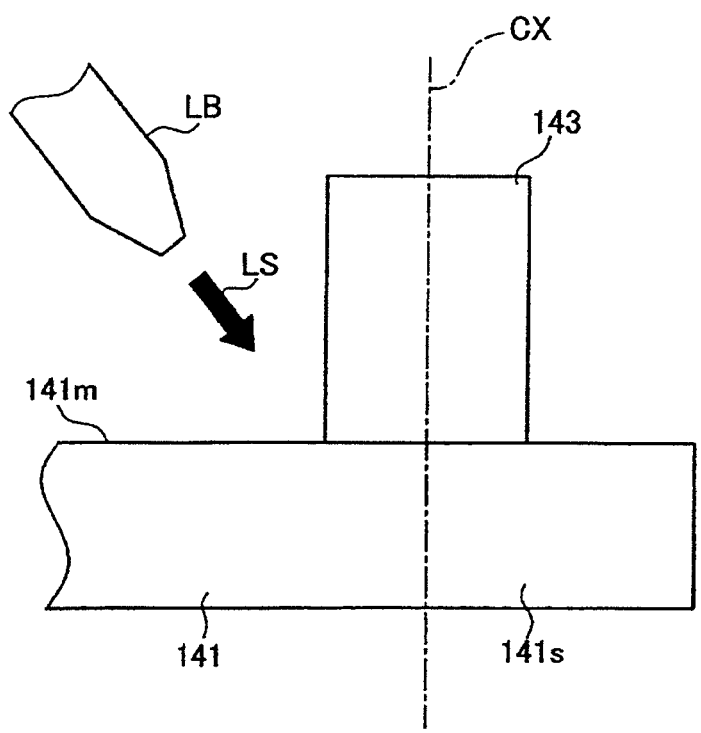
FIG. 10 is a schematic view of a state of irradiating a pulsed laser during a laser welding step for formation of the ground electrode in the manufacturing method of the spark plug according to the first embodiment of the present invention.

The second noble metal tip 143 of cylindrical column shape is separately prepared. The second noble metal tip 143 is placed at a given position on the inner side 141m of the front end 141s of the ground electrode body 141 as shown in FIG. 10. Then, the second noble metal tip 143 and the ground electrode body 141 are laser welded by irradiating the border of the second noble metal tip 143 and the ground electrode body 141 with a pulsed laser LS by a laser irradiation device LB. This step also corresponds to a laser welding step in the present invention.

More specifically, the pulsed laser LS is irradiated to form the circumferential welding area 145 in which twelve welding sports 145m1 to 145m12 corresponding to pulses M1 to M12 of the irradiated laser LS sequentially overlap and continue in the circumferential direction of an axis CX of the second noble metal tip 143 such that the second noble metal tip 143 and the ground electrode body 141 are welded via the circumferential welding area 145. At this time, the laser welding conditions are controlled to a pulse width Tb of the laser pulses M1 to m12 of 4 msec, a frequency of the laser pulses M1 to M12 of 12 Hz and a shot number of 12 pulses.

At least one of the laser pulses M1 to M12 is set to be of the initially increasing type in which the laser pulse has a waveform that the laser intensity increases with time during an initial period Tb1 from a pulse start time tsb, and/or of the finally decreasing type in which the laser pulse has a waveform that the laser intensity decreases with time during a final period Tb3 up to a pulse end time teb. Preferably, each of the initial period Tb1 and the final period Tb3 is controlled to 10% to 40% of the pulse width Tb.

In the first embodiment, the waveforms of the laser pulses M1 to M12 are set as follows as shown in FIG. 8. It is herein defined that the period of 20% of the pulse width Tb (2 msec) from the pulse start time tsb is the initial period Tb1 (0.4 msec); the period of 20% of the pulse width Tb (2 msec) up to the pulse end time teb is the final period Tb3 (0.4 msec); and the period between the initial and final periods Tb1 and Tb3 is the middle period Tb2 (1.2 msec). In each of the waveforms of the laser pulses M1 to M12, the laser intensity Sb1 increases with time during the initial period Tb1; and the laser intensity Sb3 decreases with time during the final period Tb3. Namely, all of the laser pulses M1 to M12 are set to be of the initially increasing type and of the finally decreasing type in the first embodiment.

More specifically, the laser intensity Sb1 is controlled so as to gradually and linearly increase with time, starting from zero, during the initial period Tb1 from the start time tsb to time Tmb. During the subsequent middle period Tb2 from the time tmb to time tnb, the laser intensity Sb2 is kept constant. The laser intensity Sb3 is controlled so as to gradually and linearly decrease with time during the final period Tb3 from the time tnb to the end time teb and reach zero at the end time teb.

By increasing the laser intensity Sb1 with time during the initial period Tb1 as explained above, it is possible to effectively prevent spatters from occurring and flying and adhering to the second noble metal tip 143 and the ground electrode body 141 due to sudden temperature increases at and around the surfaces of the second noble metal tip 143 and the ground electrode body 141 at the initiation of the laser irradiation. It is also possible to effectively prevent blowholes occurring in the respective welding spots 145m1 to 145m12. It is further possible, by decreasing the laser intensity Sb3 with time during the final period Tb3 as explained above, to effectively prevent cracks from occurring due to stress on the interfaces of the welding spots 145m1 to 145m12 with the second noble metal tip 143 and the ground electrode body 141 under sudden cooling of the welding spots 145m1 to 145m12.

It suffices that at least one of the laser pulses M1 to M12 is of the initially increasing type in the present invention. In other words, all or part of the laser pulses M1 to M12 can be set to the initially increasing type. In order to prevent the occurrence of the spatters and blowholes under the laser irradiation, it is preferable that all of the laser pulses M1 to M12 are of the initially increasing type as explained above.

It also suffices that at least one of the laser pulses M1 to M12 is of the finally decreasing type in the present embodiment. In other words, all or part of the laser pulses M1 to M12 can be set to the finally decreasing type. In order to prevent the occurrence of the cracks under the laser irradiation, it is preferable that all of the laser pulses M1 to M12 are of the finally decreasing type as explained above.

Figure 11:
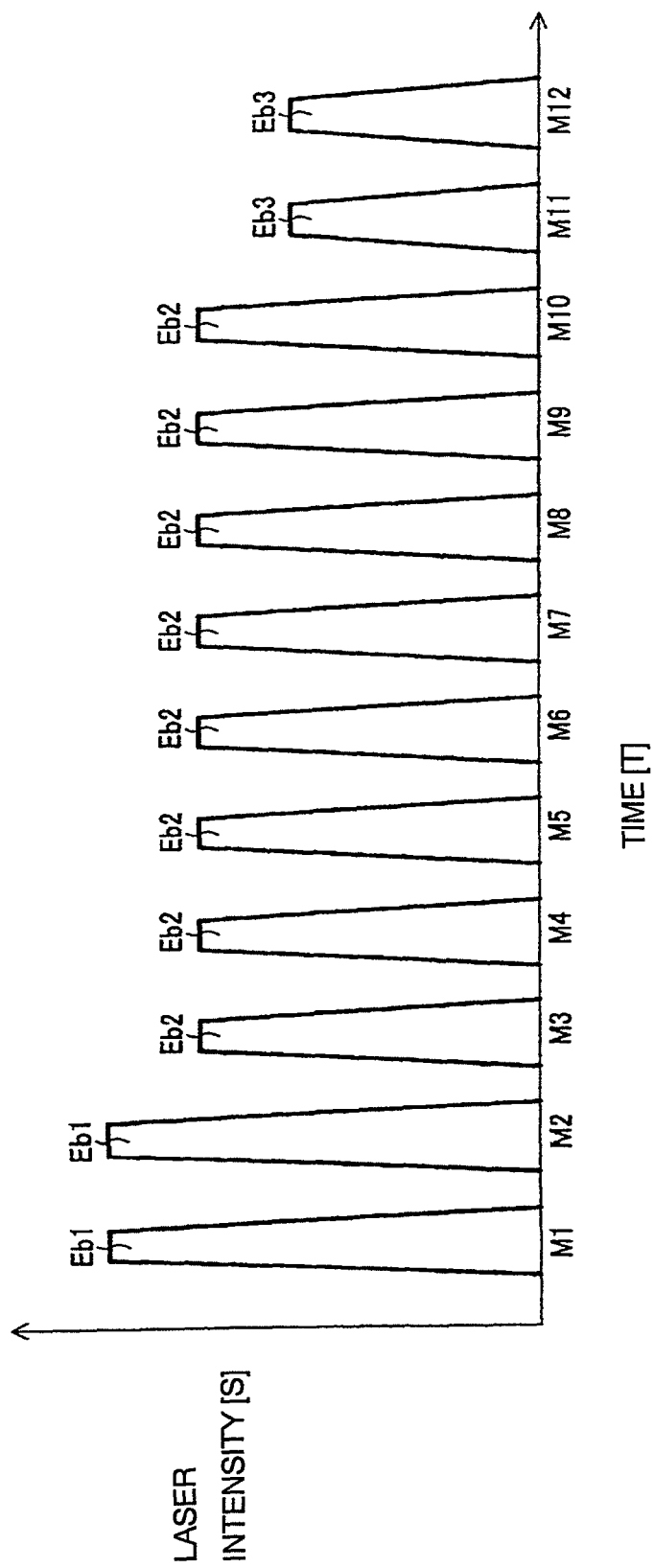
FIG. 11 is a schematic view of laser pulses of the pulsed laser irradiated at the laser welding step for formation of the ground electrode in the manufacturing method of the spark plug according to the first embodiment of the present invention.

Among the twelve laser pulse shots M1 to M12, first two laser pulses M1 and M2 are classified as initial laser pulses; last two laser pulses M11 and M12 are classified as final laser pulses; and eight laser pulses M3 to M10 between the initial laser pulses M1 and M2 and the final laser pulses M11 and M12 are classified as middle laser pulses as shown in FIG. 11 in the first embodiment. The laser irradiation energy per pulse is stepwise decreased in such a manner that: the initial laser pulse M1, M2 has the highest laser irradiation energy per pulse; and the final laser pulse M11, M12 has the lowest laser irradiation energy per pulse. It is herein preferable that: the laser irradiation energy Eb1 per pulse of the initial laser pulses M1 and M2 is 5% to 30% higher than the laser irradiation energy Eb2 per pulse of the middle laser pulses M3 to M10; and the laser irradiation energy Eb3 per pulse of the final laser pulses M11 and M12 is 5% to 30% lower than the laser irradiation energy Eb2 per pulse of the middle laser pulses M3 to M10.

In the first embodiment, the laser irradiation energy Eb2 per pulse of the eight middle laser pulses M3 to M10 is controlled to a reference energy level of 2.0 J. The laser irradiation energy Eb1 per pulse of the two initial laser pulses M1 and M2 is controlled to 2.2 J so as to be 10% higher than the laser irradiation energy Eb2 per pulse of the middle laser pulses M3 to M10. On the other hand, the laser irradiation energy Eb3 per pulse of the final laser pulses M11 and M12 is controlled to 1.8 J so as to be 10% lower than the laser irradiation energy Eb2 per pulse of the middle laser pulses M3 to M10.

The molten states of the welding spots 145m1 to 145m12 can be made uniform by controlling the laser irradiation energy stepwise to Eb1, Eb2 and Eb3 and thereby limiting the effect of the residual heat caused by the preceding laser pulses. It is thus possible to effectively prevent the occurrence of the spatters and blowholes under the laser irradiation, notably under the irradiation of the latter laser pulses. It is possible to more effectively prevent the occurrence of the spatters and blowholes under the laser irradiation by setting the laser irradiation energy Eb1 higher by a given amount than the laser irradiation energy Eb2 (i.e. setting the laser irradiation energy Eb2 lower by the given amount than the laser irradiation energy Eb1) and setting the laser irradiation energy Eb3 lower by a given amount than the laser irradiation energy Eb2.

After that, the ground electrode 140 is bent toward the axis AX so as to define the discharge gap G between the ground electrode 140 and the center electrode 130. With this, the spark plug 100 is completed.

The first embodiment of the present invention will be described in more detail by reference to the following examples. It should be however noted that the following examples are only illustrative and not intended to limit the invention thereto.

Examples 1 to 13 and Comparative Example 1

Figure 15:
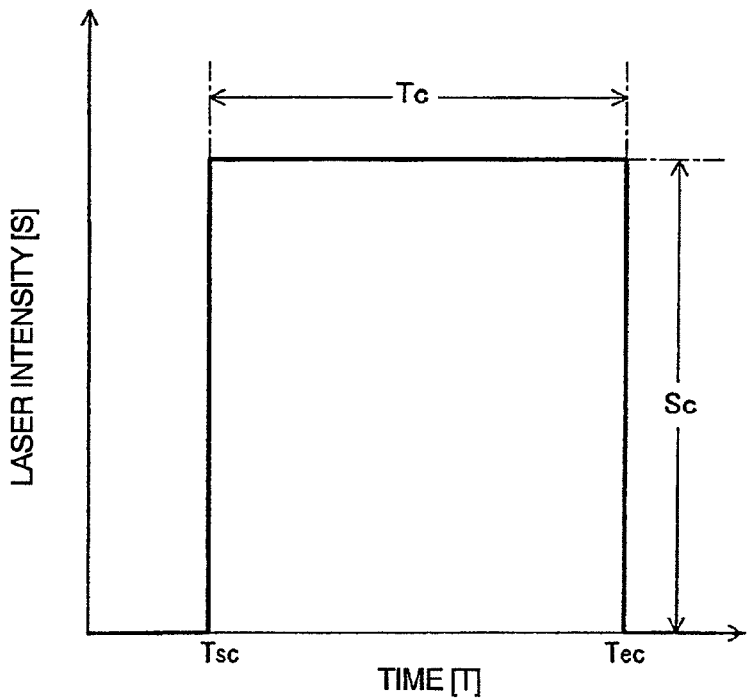
FIG. 15 is a schematic view of a laser intensity waveform of a pulsed laser irradiated in a conventional spark plug manufacturing method.

In order to verify the effects of the first embodiment, 13 kinds of the spark plug 100 were manufactured as Examples 1 to 13 by maintaining the pulse width Tb constant and changing the percentages of the initial period Tb1 and the final period Tb3 to the pulse width Tb in the formation of the ground electrode 140. More specifically, the percentage of the initial period Tb1 to the pulse width Tb was controlled to 0%, 5%, 10%, 20%, 40% and 50%; and the percentage of the final period Tb3 to the pulse width Tb was controlled to 0%, 5%, 10%, 20%, 40% and 50% as shown in TABLE 1. On the other hand, a spark plug was manufactured as Comparative Example in the same manner as above by controlling both of the initial and final periods Tb1 and Tb3 to zero, i.e., by setting the rectangular laser intensity waveform as shown in FIG. 15. In Examples 1 to 13 and Comparative Example 1, the pulse energy per pulse of the laser pulses M1 to M12 was fixed.

The appearance of the ground electrode 140 (the occurrence of spatters and the occurrence of cracks in the circumferential welding area 145) was tested on 100 samples of each of Examples 1 to 13 and Comparative Example 1. The number of the samples of the spark plug 100 in which the defects occurred was counted. Further, the samples of Examples 1 to 13 were subjected to severe heat cycle test. The heat cycle test was conducted by repeating 1000 cycles of heating the sample at 1000° C. for 2 minutes and cooling the sample naturally by air for 1 minute. The occurrence of cracks in the circumferential welding area 145 of the ground electrode 140 was checked. The heat cycle test result was rated as good in the occurrence of no crack and rated as defective in the occurrence of the cracks. The test results are indicated in TABLE 1.

TABLE 1

| | Control of pulse waveform | | Number of occurrence of defects | | |
|---|---|---|---|---|---|
| | Percentage (%) of initial period | Percentage (%) of final period | Occurrence of spatters | Occurrence of cracks | Heat cycle test result |
| Example 1 | 5 | 0 | 3 | 9 | good |
| Example 2 | 10 | 0 | 1 | 8 | good |
| Example 3 | 20 | 0 | 0 | 8 | good |
| Example 4 | 40 | 0 | 0 | 10 | good |
| Example 5 | 50 | 0 | 0 | 7 | defective |
| Example 6 | 0 | 5 | 17 | 3 | good |
| Example 7 | 0 | 10 | 20 | 0 | good |
| Example 8 | 0 | 20 | 15 | 0 | good |
| Example 9 | 0 | 40 | 13 | 0 | good |
| Example 10 | 0 | 50 | 15 | 0 | defective |
| Example 11 | 10 | 10 | 0 | 0 | good |
| Example 12 | 20 | 20 | 0 | 0 | good |
| Example 13 | 50 | 50 | 0 | 0 | defective |
| Comparative Example 1 | 0 | 0 | 18 | 7 | — |

In Examples 1 to 5 and 11 to 13 where the initial period Tb1 was 5% to 50% of the total pulse width Tb, the number of occurrence of the spatters was 3 or less so that the occurrence of the spatters was prevented or limited sufficiently. In particular, the number of occurrence of the spatters was 1 or less so that the occurrence of the spatters was prevented adequately in Examples 2 to 5 and 11 to 13 where the initial period Tb1 was 10% to 50% of the total pulse width Tb. As is apparent from the defective heat cycle test results of Examples 5 and 13 where the initial period Tb1 was 50% of the total pulse width Tb, it is preferable to control the percentage of the initial period Tb1 to 40% or less. In Examples 6 to 13 where the final period Tb3 was 5% to 50% of the total pulse width Tb, the number of occurrence of the cracks was 3 or less so that the occurrence of the cracks in the circumferential welding area 145 was prevented or limited sufficiently. In particular, the number of occurrence of the cracks was zero so that the occurrence of the cracks was prevented effectively in Examples 7 to 13 where the final period Tb3 was 10% to 50% of the total pulse width Tb. It is also preferable to control the percentage of the final period Tb3 to 40% or less as is apparent from the defective heat cycle test results of Examples 10 and 13 where the final period Tb3 was 50% of the total pulse width Tb. In Comparative Example 1, the occurrence of multiple spatters as well as multiple cracks in the circumferential welding area 145 was detected.

It has been shown by the above results that it is possible to sufficiently prevent the occurrence of the spatters and cracks at the instant immediately after the welding and in the heat cycle test by setting the initial period Tb1 during which the laser intensity Sb1 increases with time, more preferably, controlling the percentage of the initial period Tb1 to 10% to 40% of the pulse width Tb. It has also been shown that it is possible to sufficiently prevent the occurrence of the cracks at the instant immediately after the welding and in the heat cycle test by setting the final period Tb3 during which the laser intensity Sb3 decreases with time, more preferably, controlling the percentage of the final period Tb3 to 10% to 40% of the pulse width Tb.

Examples 14 to 17 and Comparative Example 2

As Examples 14 to 17, 4 kinds of the spark plug 100 were manufactured by changing the laser irradiation energy per pulse of 10 pulse shots to Ea1 for two initial laser pulses N1 and N2, Ea2 for six middle laser pulses N3 to N8 and Ea3 for two last laser pulses N9 and N10 in the formation of the center electrode 130. More specifically, the laser irradiation energy Ea2 per pulse of the middle laser pulses N3 to N8 was controlled to the reference level; the laser irradiation energy Ea1 per pulse of the initial laser pulses N1 and N2 was set 5%, 10% or 30% higher than the reference level; and the laser irradiation energy Ea3 per pulse of the final laser pulses N9 and N10 was set 10%, 30% or 50% lower than the reference level as shown in TABLE 2. On the other hand, a spark plug was manufactured as Comparative Example 2 in the same manner as above by setting the laser irradiation energy Ea1 per pulse of the initial laser pulses N1 and N2 and the laser irradiation energy Ea3 per pulse of the final laser pulses N9 and N10 to the same level as the laser irradiation energy Ea2 per pulse of the middle laser pulses N3 to N8.

The welding state of the circumferential welding area 135 was tested on each of Examples 14 to 17 and Comparative Example 2. The test results are indicated in TABLE 2.

TABLE 2

| | Laser irradiation energy per pulse | | | Welding state |
|---|---|---|---|---|
| | Initial laser pulse | Middle laser pulse | Final laser pulse | test result |
| Example 14 | 10% increased | reference level | 10% decreased | good |
| Example 15 | 30% increased | reference level | 30% decreased | good |
| Example 16 | 30% increased | reference level | 50% decreased | good |
| Example 17 | 5% increased | reference level | 10% decreased | good |
| Comparative Example 2 | reference level | reference level | reference level | defective |

In each of Examples 14 to 17, the welding state of the circumferential welding area 135 was favorable. In Comparative Example 2, the welding spot 135n1 corresponding to the first laser pulse N1 was made small. Further, the blowhole occurred in the welding spot 135n10 corresponding to the last laser pulse N10.

It has been shown by the above results that it is possible to control the welding state favorably by setting the relatively high laser irradiation energy Ea1 per pulse of the initial laser pulses N1 and N2 and setting the relatively low laser irradiation energy Ea3 per pulse of the final laser pulses N9 and N10.

[Second Embodiment]

A second embodiment of the present invention will be next described below. In the second embodiment, the laser intensity waveforms (FIG. 12) are different from those in the first embodiment in the laser welding steps of the center and ground electrodes 130 and 140. The other configurations of the second embodiment are similar to those of the first embodiment.

Figure 12:
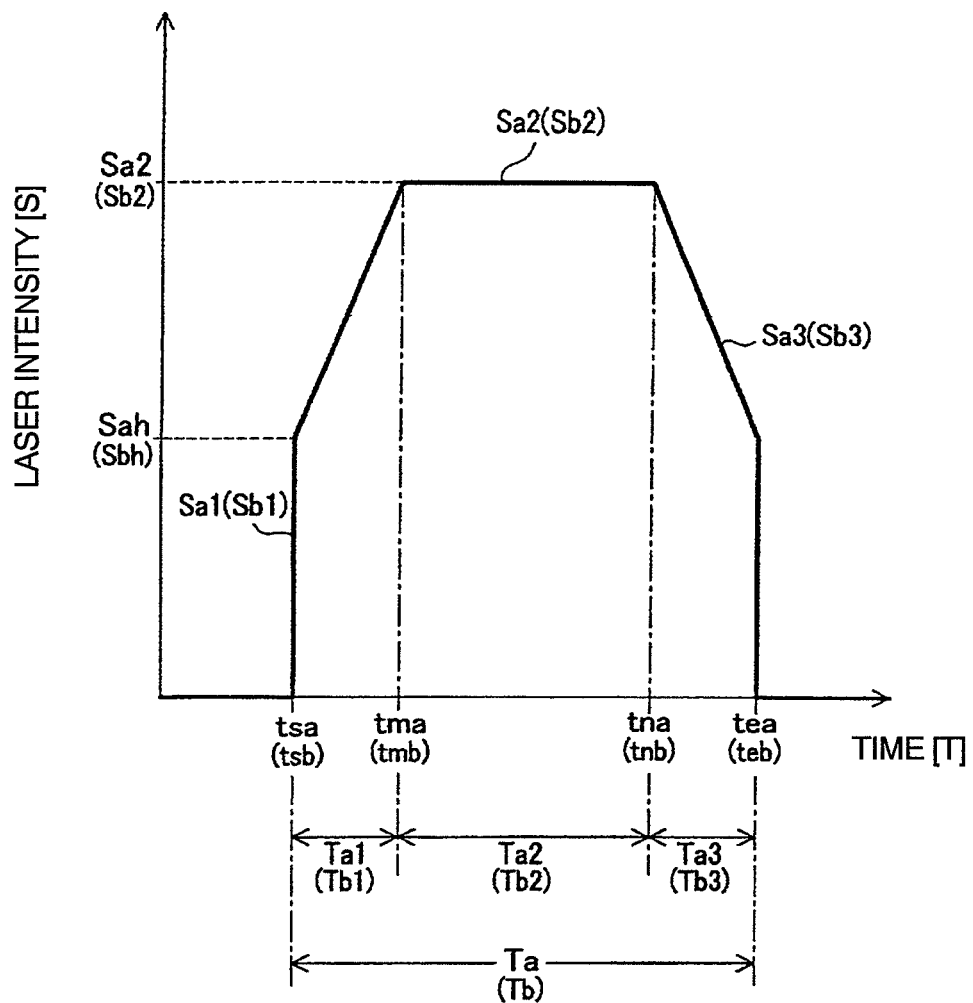
FIG. 12 is a schematic view of a laser intensity waveform of a pulsed laser irradiated during a laser welding step in a spark plug manufacturing method according to a second embodiment of the present invention.

In the second embodiment, the laser intensity waveforms of the laser pulses N1 to N10 and M1 to M12 are set as follows as shown in FIG. 12. It is herein defined that: the period of 20% of the pulse width Ta, Tb from the pulse start time tsa, tsb is the initial period Ta1, Tb1; the period of 20% of the pulse width Ta, Tb up to the pulse end time tea, teb is the final period Ta3, Tb3; and the period between the initial period Ta1, Tb1 and the final period Ta3, Tb3 is the middle period Ta2, Tb2. In each of the waveforms of the laser pulses N1 to N10 and M1 to M12, the laser intensity Sa1, Sb1 starts from a given level and gradually (linearly) increases with time during the initial period Ta1, Tb1; and the laser intensity Sb1, Sb3 gradually (linearly) decreases with time during the final period Ta1, Tb3 and ends in the given level. All of the laser pulses N1 to N10 and M1 to M12 are also set to be of the initially increasing type and of the finally decreasing type in the second embodiment.

More specifically, the laser intensity Sa1, Sb1 is controlled so as to start from the intensity level Sah, Sbh, which is half of the laser intensity level Sa2, Sb2 of the middle period Ta2, Tb2, gradually and linearly increase with time during the initial period Ta1, Tb1 from the start time tsa, tsb to the time tma, tmb, and then, reach the intensity level Sa2, Sb2 at the time tma, tmb. During the subsequent middle period Ta2, Tb2 from the time tma, tmb to the time tna tnb, the laser intensity Sa2, Sb2 is kept constant. The laser intensity Sa3, Sb3 is controlled so as to gradually and linearly decrease with time from the intensity level Sa2, Sb2 during the final period Ta3, Tb3 from the time tna, tnb to the end time tea, teb and reach the intensity level Sah, Sbh, which is half of the laser intensity level Sa2, Sb2, at the end time tea, teb.

By setting the above laser intensity waveform in which the laser intensity Sa1 and Sb1 increases with time during the initial periods Ta1 and Tb1, it is possible to prevent not only the occurrence of the spatters under the laser irradiation but the occurrence of the blowholes in the circumferential welding areas 135 and 145. It is also possible to prevent the occurrence of the cracks in the circumferential welding areas 135 and 145 by setting the laser intensity waveform in which the laser intensity Sa3 and Sb3 decreases with time during the final periods Ta3 and Tb3 as mentioned above. Other functions and effects of the second embodiment are the same to those of the first embodiment.

[Third Embodiment]

A third embodiment of the present invention will be described below. In the third embodiment, the laser intensity waveforms (FIG. 13) are different from those in the first and second embodiments in the laser welding steps of the center and ground electrodes 130 and 140. The other configurations of the third embodiment are similar to those of the first and second embodiments.

Figure 13:
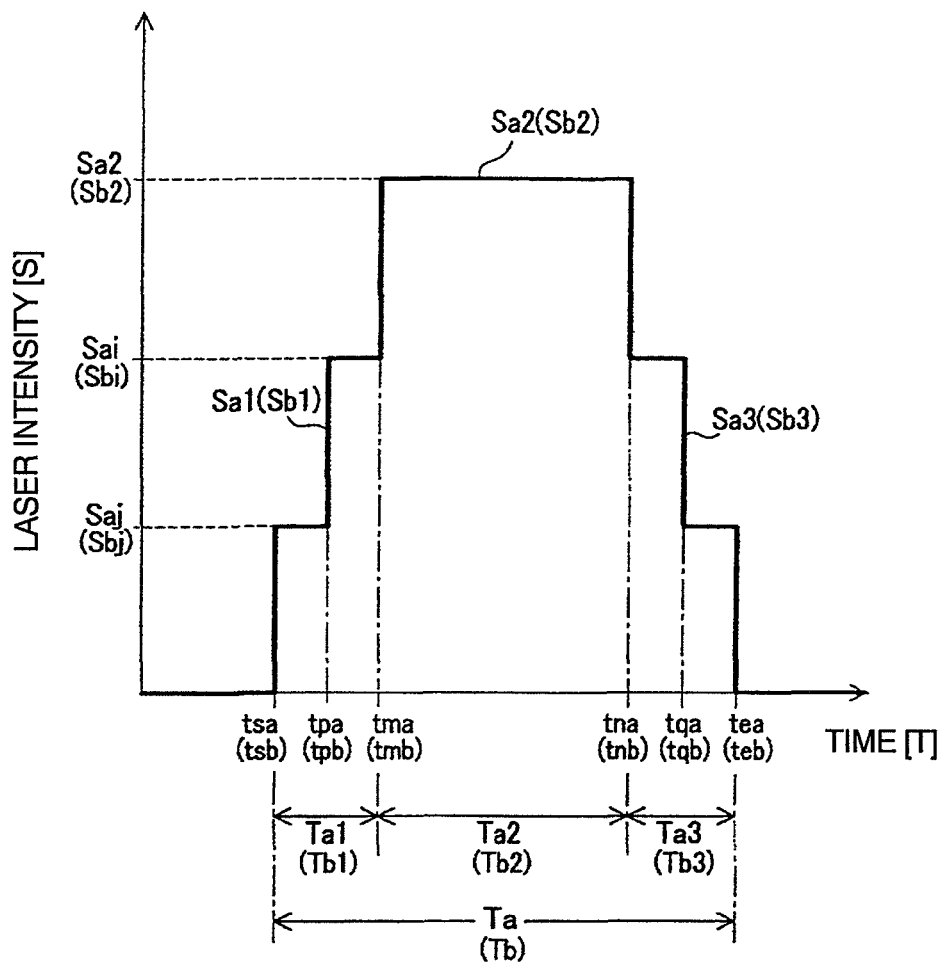
FIG. 13 is a schematic view of a laser intensity waveform of a pulsed laser irradiated during a laser welding step in a spark plug manufacturing method according to a third embodiment of the present invention.

In the third embodiment, the laser intensity waveforms of the laser pulses N1 to N10 and M1 to M12 are set as follows as shown in FIG. 13. It is herein defined that: the period of 20% of the pulse width Ta, Tb from the pulse start time tsa, tsb is the initial period Ta1, Tb1; the period of 20% of the pulse width Ta, Tb up to the pulse end time tea, teb is the final period Ta3, Tb3; and the period between the initial period Ta1, Tb1 and the final period Ta3, Tb3 is the middle period Ta2, Tb2. In each of the waveforms of the laser pulses N1 to N10 and M1 to M12, the laser intensity Sa1, Sb1 increases stepwisely with time during the initial period Ta1, Tb1; and the laser intensity Sb1, Sb3 decreases stepwisely with time during the final period Ta3, Tb3. All of the laser pulses N1 to N10 and M1 to M12 are also set to be of the initially increasing type and of the finally decreasing type in the third embodiment.

More specifically, the laser intensity Sa1, Sb1 starts from the intensity level Saj, Sbj, which is one-third of the laser intensity level Sa2, Sb2 of the middle period Ta2, Tb2, in the initial period Ta1, Tb1 between the start time tsa, tsb and the time tma, tmb. The laser intensity Sa1, Sb1 is kept constant at the intensity level Saj, Sbj during the duration from the start time tsa, tsb to the middle time tpa, tpb of the initial period Ta1, Tb1. After that, the laser intensity Sa1, Sb1 is kept constant at the intensity level Sai, Sbi, which is two-thirds of the laser intensity level Sa2, Sb2 of the middle period Ta2, Tb2, during the duration from the time tpa, tpb to the end time tma, tmb of the initial period Ta1, Tb1. During the subsequent middle period Ta2, Tb2 from the time tma, tmb to the time tna tnb, the laser intensity Sa2, Sb2 is kept constant. The laser intensity Sa3, Sb3 starts from the intensity level Sai, Sbi, which is two-thirds of the laser intensity level Sa2, Sb2 of the middle period Ta2, Tb2, in the final period Ta3, Tb3 between the time tna, tnb and the end time tea, teb. The laser intensity Sa3, Sb3 is kept constant at the intensity level Sai, Sbi during the duration from the time tna, tnb to the middle time tqa, tqb of the final period Ta3, Tb3. The laser intensity Sa3, Sb3 is then kept constant at the intensity level Saj, Sbj, which is one-third of the laser intensity level Sa2, Sb2 of the middle period Ta2, Tb2, during the duration from the time tqa, tqb to the end time tea, teb of the final period Ta3, Tb3.

By setting the above laser intensity waveform in which the laser intensity Sa1 and Sb1 increases with time during the initial periods Ta1 and Tb1, it is possible to prevent not only the occurrence of the spatters under the laser irradiation but the occurrence of the blowholes in the circumferential welding areas 135 and 145. It is also possible to prevent the occurrence of the cracks in the circumferential welding areas 135 and 145 by setting the laser intensity waveform in which the laser intensity Sa3 and Sb3 decreases with time during the final periods Ta3 and Tb3 as mentioned above. Other functions and effects of the third embodiment are the same to those of the first and second embodiments.

[Fourth Embodiment]

A fourth embodiment of the present invention will be described below. In the fourth embodiment, the laser intensity waveforms (FIG. 14) are different from those in the first to third embodiments in the laser welding steps of the center and ground electrodes 130 and 140. The other configurations of the fourth embodiment are similar to those of the first to third embodiments.

Figure 14:
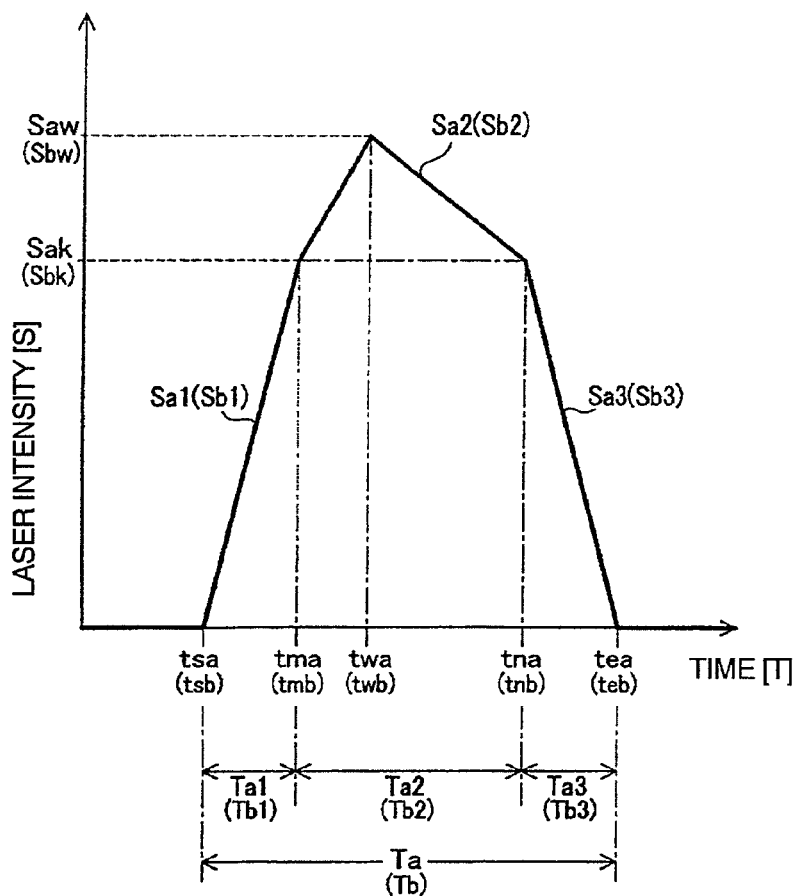
FIG. 14 is a schematic view of a laser intensity waveform of a pulsed laser irradiated during a laser welding step in a spark plug manufacturing method according to a fourth embodiment of the present invention.

In the fourth embodiment, the laser intensity waveforms of the laser pulses N1 to N10 and M1 to M12 are set as follows as shown in FIG. 14. It is herein defined that: the period of 20% of the pulse width Ta, Tb from the pulse start time tsa, tsb is the initial period Ta1, Tb1; the period of 20% of the pulse width Ta, Tb up to the pulse end time tea, teb is the final period Ta3, Tb3; and the period between the initial period Ta1, Tb1 and the final period Ta3, Tb3 is the middle period Ta2, Tb2. In each of the waveforms of the laser pulses N1 to N10 and M1 to M12, the laser intensity Sa1, Sb1 increases with time during the initial period Ta1, Tb1; and the laser intensity Sb1, Sb3 decreases with time during the final period Ta3, Tb3. All of the laser pulses N1 to N10 and M1 to M12 are also set to be of the initially increasing type and of the finally decreasing type in the fourth embodiment.

More specifically, the laser intensity Sa1, Sb1 is controlled so as to start from zero and gradually and linearly increase with time during the initial period Ta1, Tb1 from the start time tsa, tsb to the time tma, tmb. In the subsequent middle period Ta2, Tb2, the laser intensity Sa2, Sb2 is controlled so as to increase from the intensity level Sak, Sbk to the intensity level Saw, Sbw gradually and linearly with time during the duration from the time tma, tns to time twa, twb, and then, decrease to the intensity level Sak, Sbk gradually and linearly with time during the duration from the time twa, twb to time tna, tnb. The laser intensity Sa3, Sb3 is controlled so as to gradually and linearly decrease with time during the final period Ta3, Tb3 from the time tna, tnb to the end time tea, teb and reach zero at the end time tea, teb.

By setting the above laser intensity waveform in which the laser intensity Sa1 and Sb1 increases with time during the initial periods Ta1 and Tb1, it is possible to prevent not only the occurrence of the spatters under the laser irradiation but the occurrence of the blowholes in the circumferential welding areas 135 and 145. It is also possible to prevent the occurrence of the cracks in the circumferential welding areas 135 and 145 by setting the laser intensity waveform in which the laser intensity Sa3 and Sb3 decreases with time during the final periods Ta3 and Tb3 as mentioned above. Other functions and effects of the fourth embodiment are the same to those of the first to third embodiments.

Although the present invention has been described with reference to the above specific embodiments, the invention is not limited to these exemplary embodiments. Various modifications and variations of the embodiments described above will occur to those skilled in the art in light of the above teachings.

For example, the present invention can be applied to the formation of either the center electrode 130 or the ground electrode 140 although the present invention is applied to the formation of both of the center electrode 130 and the ground electrode 140 in the first to fourth embodiments.

In the first to fourth embodiments, the noble metal tip 133, 143 is laser welded to the electrode body 131, 141 in each of the center electrode 130 and the ground electrode 140 so that the present invention is applied to the laser welding of the noble metal tip 133, 143 and the electrode body 131, 141. The present invention is not limited to the above. The center electrode 130 and/or the ground electrode 140 may additionally include an intermediate member by laser welding the noble metal tip 133, 143 to the intermediate member and joining the intermediate member to the electrode body 131, 141 so that the present invention is applied to the laser welding of the noble metal tip 133, 143 and the intermediate member. In this case, the intermediate member corresponds to an electrode body in the present embodiment.

In the first embodiment, the initial period Ta1, Tb1 and the final period Ta3, Tb3 are controlled to the same length. Alternatively, the final period Ta3, Tb3 may be set longer than the initial period Ta1, Tb1. In this case, it is possible to particularly effectively prevent the occurrence of the spatters as well as the occurrence of the blowholes and cracks in the welding spots.

Figure 16:
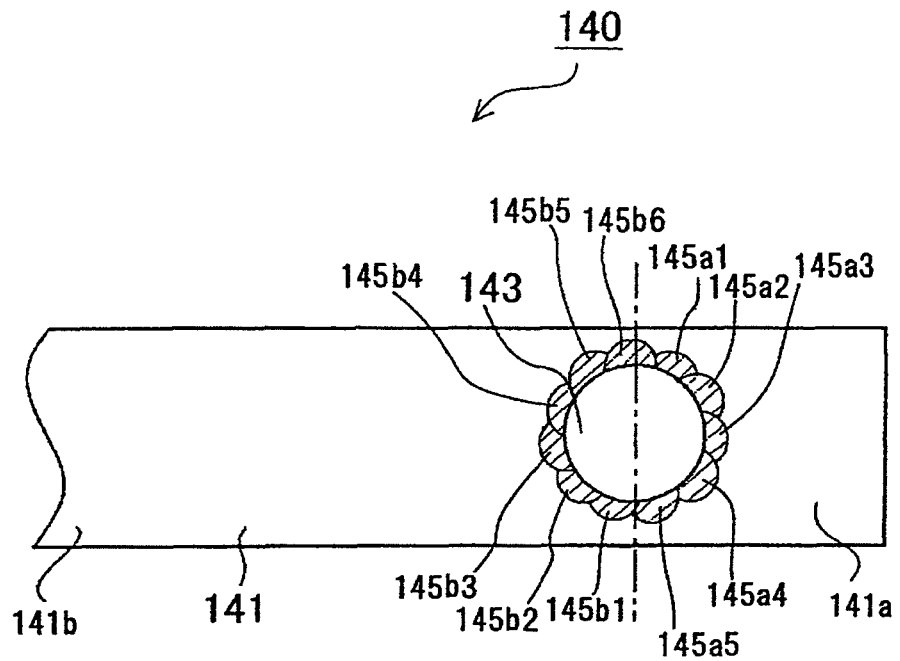
FIG. 16 is an enlarged section view of a front end portion of a ground electrode in a spark plug manufacturing method according to another embodiment of the present invention.

When the ground electrode body 141 has a front area 141a on a front side of the circumferential direction of the second noble metal tip 143 with respect to the axis of the second noble metal tip 143 and a rear area 141b on a rear side (metal shell 100 side) of the circumferential direction of the second noble metal tip 143 with respect to the axis of the second noble metal tip 143 as shown in FIG. 16, it is preferable in the laser welding of the ground electrode body 141 and the second noble metal tip 143 to form front welding spots 145a (145a1 to 145a5) on the front area 141a of the ground electrode body 141, and then, form rear welding spots 145b (145b1 to 145b6) on the rear area 141b of the ground electrode body 141. More specifically, it is preferable to start the laser irradiation from the position of the front welding spot 145a1 (i.e. the position on the front end 141s of the ground electrode body 141, other than the frontmost position, in the circumferential direction of the noble metal tip 143 placed at the given position on the ground electrode body 141) and carry out the laser irradiation in the circumferential direction toward the rear via the frontmost welding spot 145a3 (the frontmost position) so as to form the front welding spots 145a1 to 145a5 and the rear welding spots 145b1 to 145b6 in this order. The welding spots are connected to each other by forming the welding spots sequentially in such a manner that each welding spot overlaps the immediately preceding welding spot. The front end 141s of the ground electrode body 141 is apart from the metal shell 110 and is thus poorer in heat radiation than the rear end 141k of the ground electrode body 141 fixed to the metal shell 110. In the case of forming the welding spots sequentially in the laser welding step, temperature rises are likely to occur in the welding spots formed during the latter half of the laser welding step. In consequence, the blowholes are likely to occur due to overheating of the welding spots when the welding spots are formed on the front end 141s of the ground electrode body, which is poor in heat radiation in the circumferential direction of the noble metal tip 143, during the latter half of the laser welding step. It is thus possible to avoid overheating of the welding spots 145a and 145b and prevent the occurrence of the blowholes effectively by forming the front welding spots 145 during the first half of the laser welding step in which overheating is less likely to occur, and then, forming the rear welding spots during the latter half of the laser welding step in which overheating is likely to occur.

In the first to fourth embodiment, a single laser beam LS is used in the laser welding step. Alternatively, the laser welding step may be performed by simultaneously irradiating laser beams on the first noble metal tip or second noble metal tip from a plurality of opposing directions (e.g. from two directions) via the noble metal tip. This welding technique is however likely to cause blowholes because of a large amount of heat applied per unit time to the noble metal tip as compared with the case of forming one welding spot by irradiating a single laser beam in one direction. It is thus preferable to conduct single welding spot forming operation between multi welding spot simultaneous forming operations or to conduct one or more single welding spot forming operations after one or more multi welding spot simultaneous forming operations. As the residual heat due to the formation of the preceding welding spots is assumed to be maximum at the time of forming the last welding spot, it is particularly preferable to form at least the last welding spot individually by irradiating the laser beam from one direction, rather than to form the last welding spot simultaneously with the other welding spot or spots by irradiating the laser beams simultaneously from the multiple directions. With this, the application of heat generated at the formation of the last welding spot can be reduced to limit the effect of the residual heat caused by the preceding laser pulses and make the molten states of the welding spots uniform for effective prevention of the blowholes. For example, it is conceivable in FIG. 16 to simultaneously form the front welding spot 145a1 and the rear welding spot 145b1, the front welding spot 145a2 and the rear welding spot 145b2, the front welding spot 145a3 and the rear welding spot 145b3, the front welding spot 145a4 and the rear welding spot 145b4, and then, the front welding spot 145a5 and the rear welding spot 145b5 in pairs, and finally form the rear welding spot 145b6 alone. In this way it possible to not only improve the laser welding efficiency but prevent the occurrence of the blowholes due to overheating by combination of the multi welding spot simultaneous formation and the single welding spot formation.

Figure 17A:
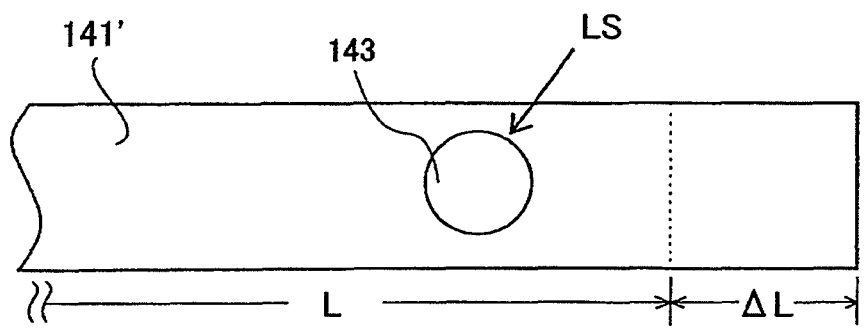
FIG. 17A is an enlarged section view of the front end portion of the ground electrode before a laser welding step in the spark plug manufacturing method according to another embodiment of the present invention.
Figure 17B:
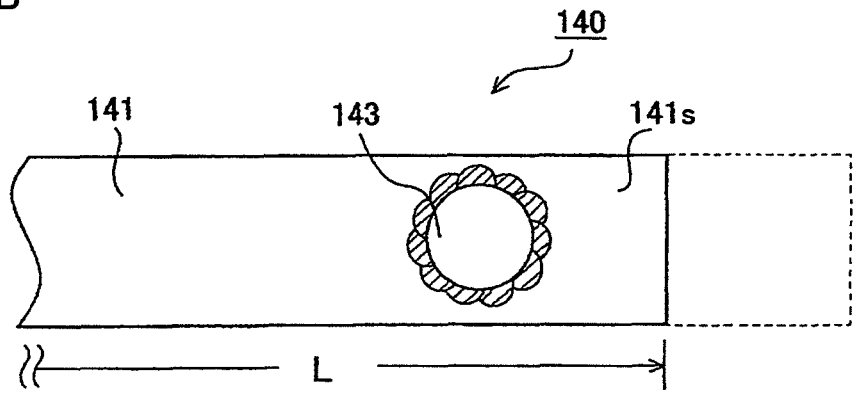
FIG. 17B is an enlarged section view of the front end portion of the ground electrode after the laser welding step and cutting step in the spark plug manufacturing method according to another embodiment of the present invention.

Furthermore, it is feasible to perform the laser welding of the ground electrode body 141 and the second noble metal tip 143 by preparing a preprocessed ground electrode body material 141', which is lengthened toward the front to be ΔL longer than a predetermined length L of the ground electrode body 141 as shown in FIG. 17A, laser welding the second noble metal tip 143 onto the preprocessed ground electrode body material 141' and cutting the preprocessed ground electrode body material 141' to the predetermined length of the ground electrode body 141 as shown in FIG. 17B. As the front end 141s of the ground electrode body 141 is located away from the metal shell and is thus poorer in heat radiation than the rear end 141k of the ground electrode body 141 fixed to the metal shell 110, the blowholes are likely to occur due to the temperature rises of the welding spots in the case of forming the latter welding spots on the front end of the ground electrode body 141 in the circumferential direction of the noble metal tip 143. It is possible to avoid the temperature rises of the welding spots and prevent the occurrence of the blowholes effectively by using the preprocessed ground electrode body material 141', which is lengthened toward the front to be longer than the predetermined length L of the ground electrode body 141, and thereby increasing the volume of the front end of the ground electrode body 141 at the laser welding step.

The invention claimed is:

1. A manufacturing method of a spark plug, the spark plug having a center electrode and a ground electrode with a discharge gap left therebetween, at least one of the center electrode and the ground electrode having an electrode body containing a base metal and a noble metal tip welded to the electrode body, the manufacturing method comprising a laser welding step for welding the noble metal tip and the electrode body by placing the noble metal tip at a given position on the electrode body, irradiating a pulsed laser onto the noble metal tip and the electrode body and thereby sequentially forming welding spots corresponding to pulses of the laser in a circumferential direction of the noble metal tip, wherein at least one of the laser pulses is an initially increasing type laser pulse having a laser intensity waveform in which a laser intensity increases with time during a predetermined initial period from a pulse start time and remains at a constant laser intensity level during a predetermined middle period subsequent to the initial period, and wherein the laser intensity of the initially increasing type laser pulse starts from a given level, which is one-third to one-half of the laser intensity level of the middle period, and gradually increases with time during the initial period.

2. The manufacturing method of the spark plug according to claim 1, wherein the initial period is 10% to 40% of a pulse width of the laser intensity waveform of the initially increasing type laser pulse.

3. The manufacturing method of the spark plug according to claim 1, the laser irradiation energy per pulse of the laser pulses are decreased stepwisely in such a manner that a first one of the laser pulses has the highest laser irradiation energy per pulse and a last one of the laser pulses has the lowest laser irradiation energy per pulse.

4. The manufacturing method of the spark plug according to claim 3, wherein the laser pulses includes a predetermined number of initial laser pulses at the beginning thereof, a predetermined number of final laser pulses at the end thereof and middle laser pulses between the initial laser pulses and the final laser pulses; the laser irradiation energy per pulse of the laser pulses decreases in a stepwise manner from the initial laser pulses to the middle laser pulses and from the middle laser pulses to the final laser pulses; and the laser irradiation energy per pulse of the initial laser pulses is 5% to 30% higher than that of the middle laser pulses.

5. The manufacturing method of the spark plug according to claim 3, wherein the laser pulses includes a predetermined number of initial laser pulses at the start thereof, a predetermined number of final laser pulses at the end thereof and middle laser pulses between the initial laser pulses and the final laser pulses; the laser irradiation energy per pulse of the laser pulses decreases in a stepwise manner from the initial laser pulses to the middle laser pulses and from the middle laser pulses to the final laser pulses; and the laser irradiation energy per pulse of the final laser pulses is 5% to 30% lower than that of the middle laser pulses.

6. The manufacturing method of the spark plug according to claim 1, wherein the laser welding step includes: forming a plurality of ones of the welding spots simultaneously by irradiating beams of the laser simultaneously from a plurality of directions; and forming a single one of the welding spots by irradiating a beam of the laser from one direction.

7. The manufacturing method of the spark plug according to claim 1, wherein the electrode body is that of the ground electrode; and the laser welding step includes: forming front ones of the welding spots on a front side of the ground electrode body in the circumferential direction of the noble metal tip placed at the given position on the ground electrode body; and then, forming rear ones of the welding spots on a rear side of the ground electrode body in the circumferential direction of the noble metal tip placed at the given position on the ground electrode body.

8. The manufacturing method of the spark plug according to claim 1, wherein the electrode body is that of the ground electrode; and, in the laser welding step, the irradiation of the laser is started from a front position, other than a frontmost position, of the ground electrode body in the circumferential direction of the noble metal tip placed at the given position on the ground electrode body and is carried out in the circumferential direction toward the rear via the frontmost position.

9. The manufacturing method of the spark plug according to claim 1, wherein the electrode body is that of the ground electrode body having a predetermined length; and the laser welding step includes: preparing a preprocessed ground electrode body material that is lengthened toward the front to be longer than the predetermined length of the ground electrode body; welding the noble metal tip to the preprocessed ground electrode body material at a position corresponding to the given position of the ground electrode body; and, after the welding of the noble metal tip to the preprocessed ground electrode body material, cutting the preprocessed ground electrode body material to the predetermined length.

10. A manufacturing method of a spark plug, the spark plug having a center electrode and a ground electrode with a discharge gap left therebetween, at least one of the center electrode and the ground electrode having an electrode body containing a base metal and a noble metal tip welded to the electrode body, the manufacturing method comprising a laser welding step for welding the noble metal tip and the electrode body by placing the noble metal tip at a given position on the electrode body, irradiating a pulsed laser onto the noble metal tip and the electrode body and thereby sequentially forming welding spots corresponding to pulses of the laser in a circumferential direction of the noble metal tip, wherein at least one of the laser pulses is a finally decreasing type laser pulse having a laser intensity waveform in which a laser intensity decreases with time during a predetermined final period up to a pulse end time and remains at a constant laser intensity level during a predetermined middle period prior to the final period, wherein the laser intensity of the finally decreasing type laser pulse gradually decreases with time and ends in a given level, which is one-third to one-half of the laser intensity level of the middle period, during the final period.

11. The manufacturing method of the spark plug according to claim 10, wherein the final period is 10% to 40% of a pulse width of the laser intensity waveform of the finally decreasing type laser pulse.

12. The manufacturing method of the spark plug according to claim 10, wherein at least one of the laser pulses is an initially increasing type laser pulse having a laser intensity waveform in which a laser intensity increases with time during an initial period from a pulse start time and remains at a constant laser intensity level during a predetermined middle period subsequent to the initial period, wherein the laser intensity of the initially increasing type laser pulse starts from a given level, which is one-third to one-half of the laser intensity level of the middle period, and gradually increases with time during the initial period.

13. The manufacturing method of the spark plug according to claim 12, wherein the initial period is 10% to 40% of a pulse width of the laser intensity waveform of the initially increasing type laser pulse.

14. The manufacturing method of the spark plug according to claim 12, wherein the final period of the laser pulse is set longer than the initial period of the laser pulse.

* * * * *